United States Patent

Blitchington, Jr. et al.

[45] Mar. 7, 1972

[11] 3,647,961

[54] T.V.-AIDED FLAW DETECTION USING ROTATING IMAGE TECHNIQUES

[72] Inventors: Frank H. Blitchington, Jr., Greensboro; Richard A. Harris, High Point, both of N.C.

[73] Assignee: Western Electric Company, Incorporated, New York, N.Y.

[22] Filed: Apr. 9, 1970

[21] Appl. No.: 27,074

[52] U.S. Cl. ................... 178/7.85, 178/DIG. 6, 178/DIG. 37
[51] Int. Cl. .......................................................... H01j 29/89
[58] Field of Search ................. 178/DIG. 1, DIG. 6, DIG. 21, 178/7.85, 7.88, 7.89, DIG. 37

[56] References Cited

UNITED STATES PATENTS

| 3,389,789 | 6/1968  | Watson et al. | 178/DIG. 1 |
|-----------|---------|---------------|------------|
| 3,216,311 | 11/1965 | Bibbero et al.| 178/DIG. 1 |
| 3,280,692 | 10/1966 | Milnes et al. | 178/DIG. 1 |
| 3,019,347 | 1/1962  | Laycak        | 178/DIG. 1 |
| 2,774,964 | 12/1956 | Baker et al.  | 178/DIG. 21 |
| 3,459,888 | 8/1969  | Sokolov       | 178/7.7    |
| 3,367,046 | 2/1968  | Neuberger     | 178/DIG. 20 |

Primary Examiner—Robert L. Griffin
Assistant Examiner—Richard K. Eckert, Jr.
Attorney—W. M. Kain, R. P. Miller and W. L. Williamson

[57] ABSTRACT

Rapid and automatic inspection of a light transparent, circumferentially bounded region of a workpiece to detect opaque flaws located in the region is accomplished by aligning the center of curvature of the region with the center of the field of view of a video camera and rotating the image of the region in the field of view by means of a dove prism or the like. Circuitry synchronized with the horizontal sweep and vertical scan of the camera establishes a reference pulse when a predetermined search area of the field of view located in the path of rotation of the annular region image is scanned by the camera. Upon rotation of the image of an opaque flaw in the region through the predetermined search area, the video pulse output of the camera coincidence gate generates an output indication representative of the presence of the flaw.

8 Claims, 8 Drawing Figures

Patented March 7, 1972
3,647,961
5 Sheets-Sheet 1
FIG-1
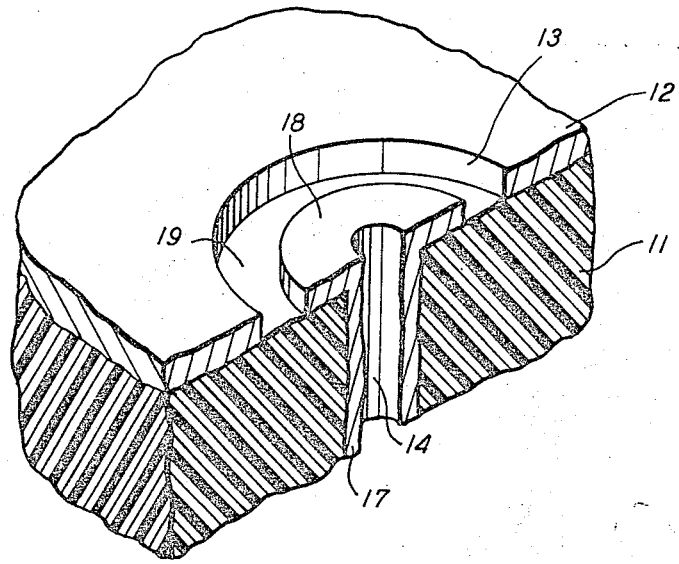
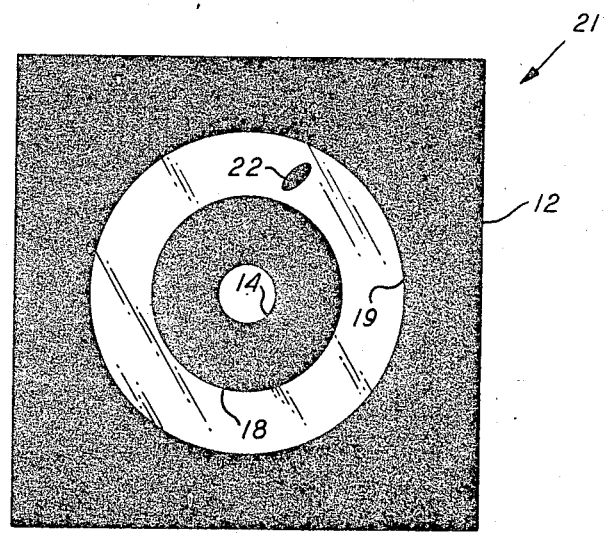
FIG-2
INVENTORS
F. H. BLITCHINGTON JR.
R. A. HARRIS
By
ATTORNEY

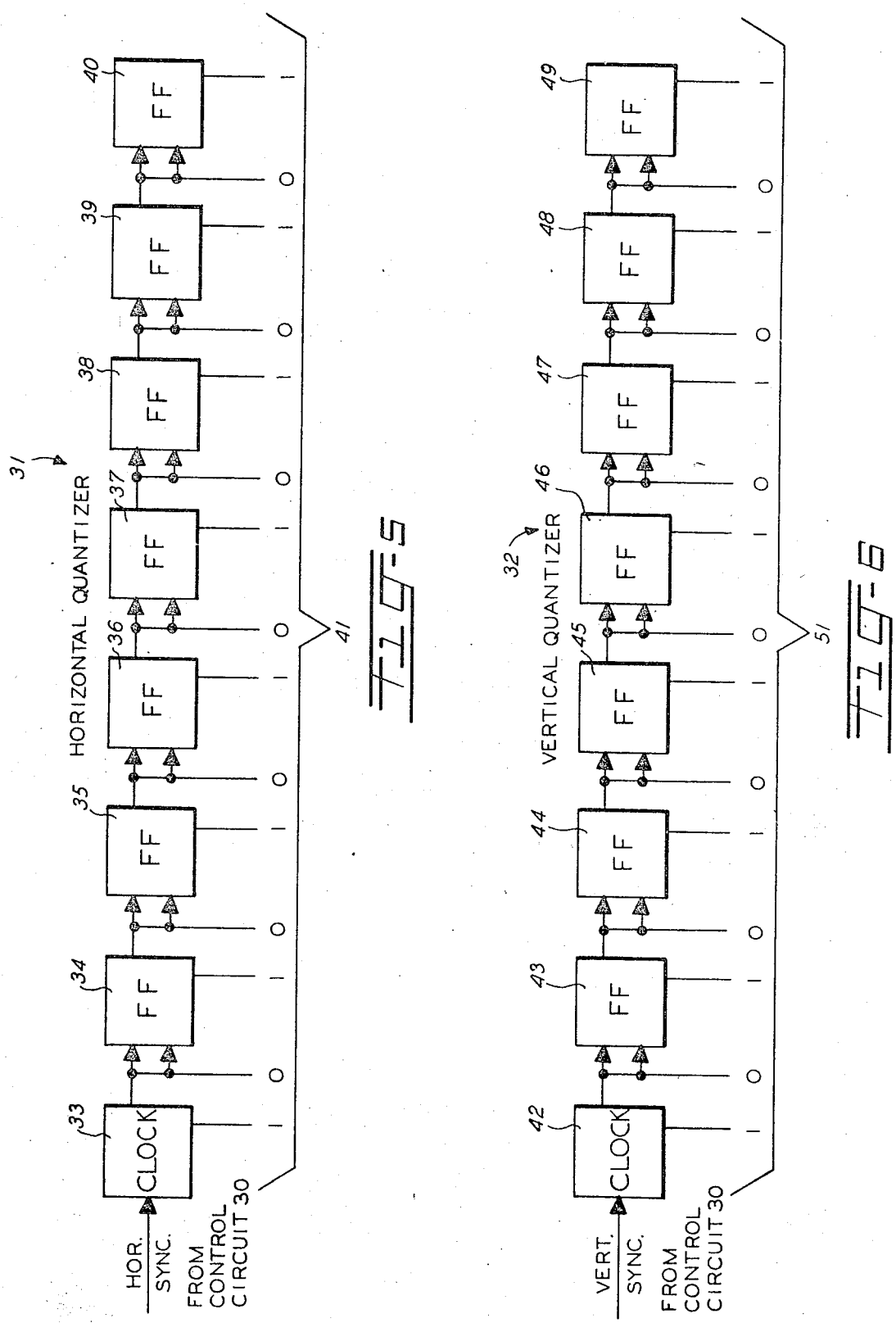

T.V.-AIDED FLAW DETECTION USING ROTATING IMAGE TECHNIQUES

BACKGROUND OF THE INVENTION

A conductive terminal of a plated through-hole in a multilayer printed circuit board is generally insulated from an adjacent metallic pattern on the board by an uncoated annular region which may be formed by suitably etching away the coating on the corresponding region of the board. Occasionally, because of incomplete etching or because of contamination occurring during processing of the printed circuit, unwanted conductive material may be left in the annular insulating region. Such conductive material may immediately or eventually bridge the insulating region and establish electrical contact between the plated through-hole terminal and the surrounding metallic pattern, and to that extent destroy the utility of the associated circuit.

Since such annular insulating areas are both small and numerous on typical printed circuit boards, the direct visual inspection by an operator (with or without optical aids) of all such areas for unwanted conductive material therein is fatiguing, time consuming, and expensive.

SUMMARY OF THE INVENTION

The present invention provides an automatic and rapid technique for detecting flaws within a test zone of a workpiece wherein each such flaw exhibits a light transmissive characteristic that is complementary to that of the test zone. Illustratively, such test zone may be an X-ray negative of the above-mentioned annular insulating space of a printed circuit board; in such case, the annular space shows up optically transparent while a conductive flaw in the annular space and the conductively plated regions disposed inward and outward of the annular space show up optically opaque.

An illustrative embodiment of the invention employs as a workpiece the above-mentioned X-ray negative of the region surrounding a plated through-hole on a printed circuit board. In this embodiment, a video camera is positioned with its axis aligned with the center of curvature of the test zone. Accordingly, the camera output video includes a representation of the light intensity excursion of the portion of the workpiece centered in the field of view and including the test zone.

A first digital quantizer synchronized with each horizontal sweep of the camera is arranged to produce, during each sweep, a first pulse whose time position within the sweep duration represents a vertically bounded first predetermined sector in the field of view. In like manner, a second digital quantizer is operated in synchronism with each vertical scan of the camera to produce a second pulse whose time position within the vertical scan represents a horizontally bounded second predetermined sector in the field of view. The first and second pulses are adjusted to coincide at least partially in time so that the first and second sectors intersect to define a predetermined search area on the field of view.

A truncated isosceles right triangular prism (i.e., a "dove" prism) is aligned with the camera axis intermediate the workpiece and the camera. The prism is rotated about its axis to correspondingly rotate the image of the workpiece in the field of view of the camera.

If any opaque flaw in present in the annular test zone, the rotating image of the flaw will move through the search area of the camera field of view so that the video pulse representation of the rotating flaw at the output of the camera will coincide with the first and second pulses whenever the image of the flaw coincides with the search area. A suitable gating arrangement is provided for detecting the required coincidence among the first, second, and video pulses to provide an output indication of the presence of the flaw.

The first and second digital quantizers may be adjusted to align the search area radially with a selected portion of the image of the annular region in the field of view.

BRIEF DESCRIPTION OF THE DRAWINGS

The nature of the invention and its advantages will appear more fully from the following detailed description taken in conjunction with the appended drawing, in which:

FIG. 1 is a fragmentary view, partly in section, of an enlarged portion of a printed circuit board in the immediate vicinity of a plated through-hole terminal thereon, illustrating an annular insulating region between the terminal and a surrounding conductive pattern;

FIG. 2 is a plan view of an X-ray negative of a portion of the printed circuit board centered on the through-hole containing a conductive flow in the annular region, wherein the annular region is optically transparent and wherein both the surrounding conductive portions of the board as well as the flaw in the annular region are optically opaque;

FIG. 5 is a block diagram of a horizontal quantizer suitable for use in the apparatus of FIG. 3;

FIG. 6 is a block diagram of a vertical quantizer suitable for use in the apparatus of FIG. 3;

DETAILED DESCRIPTION

Figure 3:
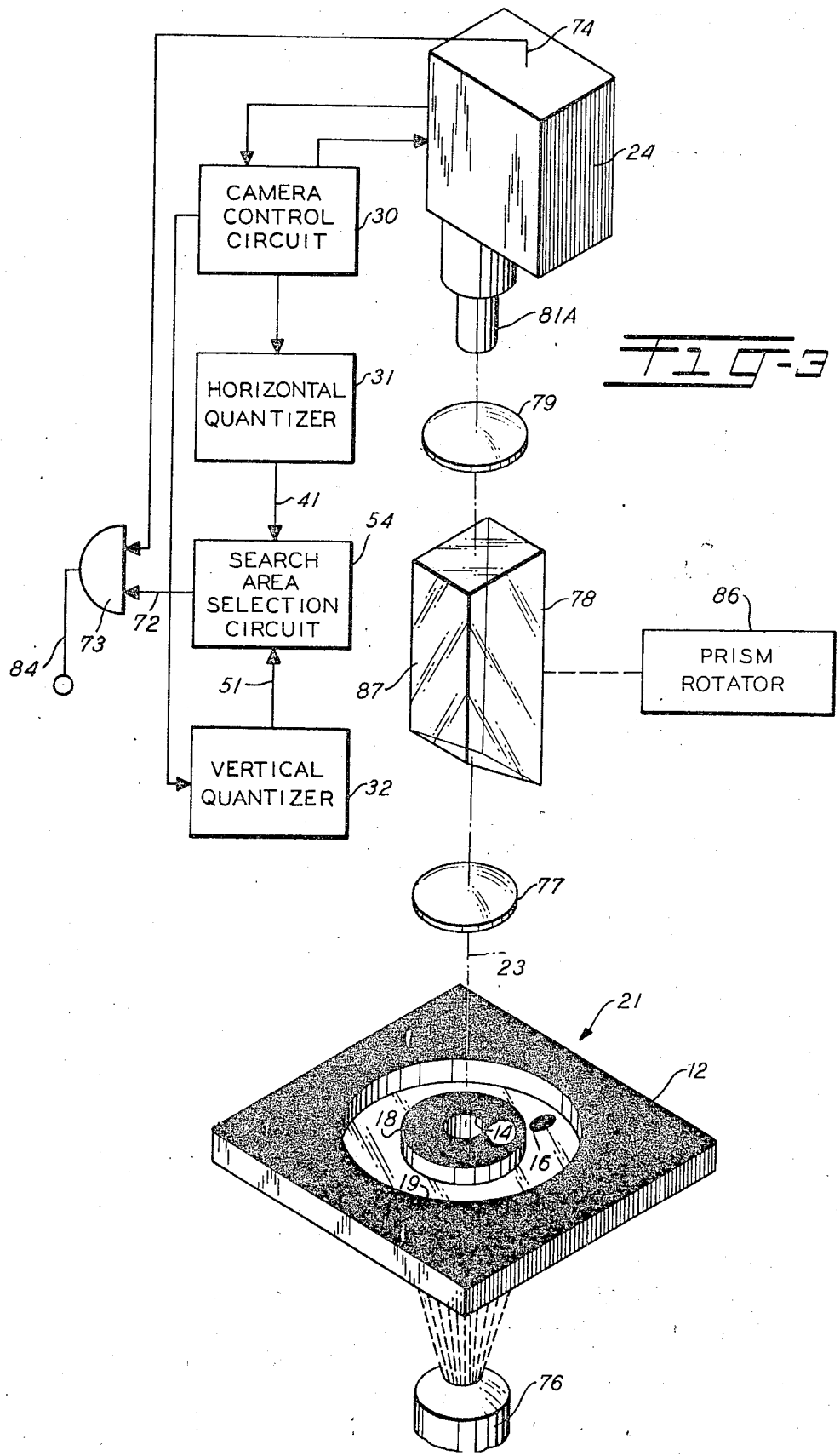
FIG. 3 is an overall pictorial diagram of an arrangement in accordance with the invention for detecting the presence of opaque flaws in the negative of FIG. 2.

Referring now to the drawing, there is depicted in enlarged form a small portion of a coated multilayer printed circuit board 11 on whose outer surface a conductive pattern 12 is defined. The pattern 12 is illustratively bounded inwardly by an annular surface 13.

A through-hole 14 in the printed circuit board is centered within the insulating space defined by the surface 13. The through-hole is plated with a conductive coating 17 which terminates at the surface of the printed circuit board in a metallic terminal 18. The resulting uncoated annular region, designated 19, between the outer surface of the terminal 18 and the inner surface of the pattern 12 will hereafter sometimes be referred to as a "test zone." The test zone 19 may be conventionally be defined by etching techniques.

As will be recognized, proper operation of the printed circuit on the board of FIG. 1 requires that the plated through-hole terminal 18 and the surrounding pattern 12 must be electrically isolated at all times. Hence, it is important to ascertain that no conductive flaws exist in the test zone which might immediately or eventually bridge the gap between the pattern 12 and the terminal 18 and destroy the isolation between these two regions.

FIG. 2 depicts a conventional X-ray negative 21 of a region of the circuit board centered around the through-hole 14 and including both the test zone 19 and a portion of the surrounding coating 12. Since insulating regions of the printed circuit board are transparent to X-rays while conductive regions thereon are opaque, the X-ray negative 21 is transparent in the region of the test zone 19 and opaque in the surrounding regions representing the terminal 18 and the surrounding pattern 12. A conductive flaw of the type described above is illustratively represented by an opaque region 22 within the test zone.

In accordance with the invention, T.V.-aided inspection facilities are provided as shown in FIG. 3 for detecting the presence of an opaque flaw in a circumferentially bounded test zone, such as the annular zone 19 on the workpiece embodied by the X-ray negative 21. As shown, the center of curvature of the test zone 19, i.e., the center of the plated through-hole 14, is aligned with an axis 23 of a conventional video camera 24. Such alignment may be accomplished manually, with optical aids, or automatically by means of an object positioning system described, e.g., in the copending, coassigned application, Ser. No. 719,923, filed Apr. 9, 1968, in the name of F. H. Blitchington, Jr., and entitled "Pattern Sensing and Positioning System."

Figure 4:
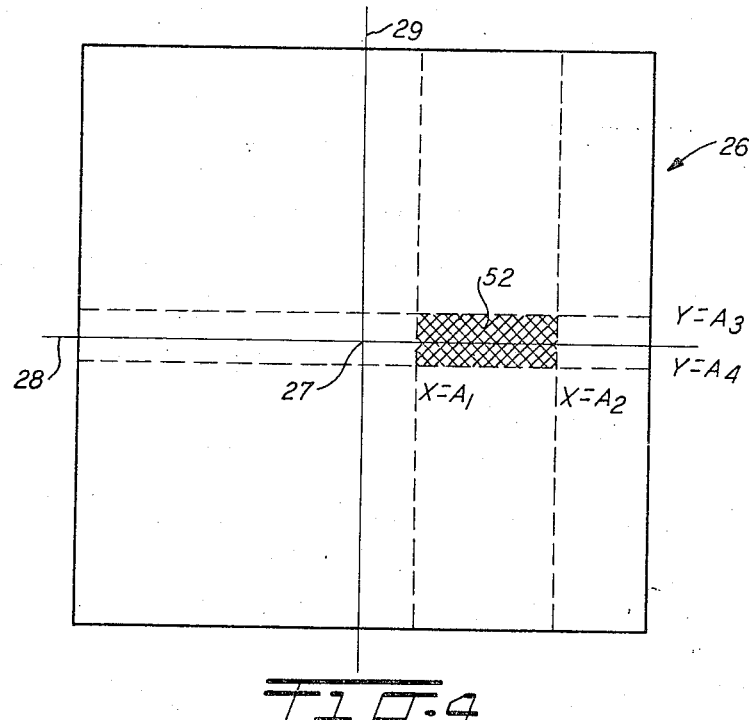
FIG. 4 is a diagrammatic representation of the field of view of a video camera employed in the apparatus of FIG. 3, wherein a common search area of the field of view is defined by vertically bounded predetermined portions of the horizontal sweeps of the camera and by horizontally bounded predetermined portions of the vertical scans of the camera.

The camera 24 has a field of view perpendicular to the axis 23. As represented schematically in FIG. 4, the field of view (designated 26) is centered at a point 27 which represents the intersection of the axis 23 (FIG. 3) and a pair of horizontal and vertical cross-hairs 28 and 29 (FIG. 4). As indicated below, the image of an object located within the field of view of the camera will be detected during synchronized horizontal sweeps and vertical scans of the camera under the control of a conventional camera control circuit 30 (FIG. 3). One type of video camera suitable for this purpose is Cohu Electronics Model No. 2000, distributed under the trade name *Kintel*. A suitable camera control circuit is Cohu Electronics Model No. 3900.

In a well-known manner, the camera control circuit 30 generates synchronizing pulses at the start of each horizontal sweep and vertical scan of the camera. Such synchronizing pulses are applied to the camera 24 and also to horizontal and vertical quantizers 31 and 32, respectively.

Referring to FIG. 5, the horizontal quantizer responds to such horizontal synchronizing pulse at the start of each horizontal sweep of the camera for operating a tandem arrangement of a clock generator 33 and a plurality of flip-flops 34–40 in a binary counting arrangement. The outputs, generally designated 41, of the clock 33 and the flip-flops 34–40 illustratively divide each horizontal sweep of the camera into unique increments representative of 256 different combinations of output signals generated as the counter is stepped by each cycle of the clock 33. Since each combination of signals on the outputs 41 occurs at a different time during a sweep, each combination of output signals is associated with the start of a unique vertically bounded increment extending in a horizontal direction along the camera field of view 26 (FIG. 4).

In like manner, the vertical quantizer 32 (FIG. 6) includes a clock 42 and a plurality of flip-flops 43–49 excited by each vertical synchronizing pulse from the camera control circuit 30 to produce 256 different combinations of signals on outputs 51 occurring at different times. Each combination of signals on the outputs 51 corresponds to the start of a unique horizontally bounded increment extending vertically in the camera field of view 26 (FIG. 4).

Certain combinations of the output signals of the horizontal and vertical quantizers are employed to electrically define a predetermined search area 52 shown cross-hatched on the field of view. The area 52 is vertically bounded on the left at position $X=A_1$, which corresponds to a first predetermined combination of signals on the outputs of the horizontal quantizer. The area 52 is bounded on the right at position $X=A_2$, which corresponds to a second combination of signals at the quantizer outputs.

Similarly, the area 52 is horizontally bounded at the top at position $Y=A_3$, which corresponds to a first combination of signals at the outputs of the vertical quantizer, and at the bottom at position $Y=A_4$, represented by a different combination of signals on the quantizer outputs.

Figure 7:
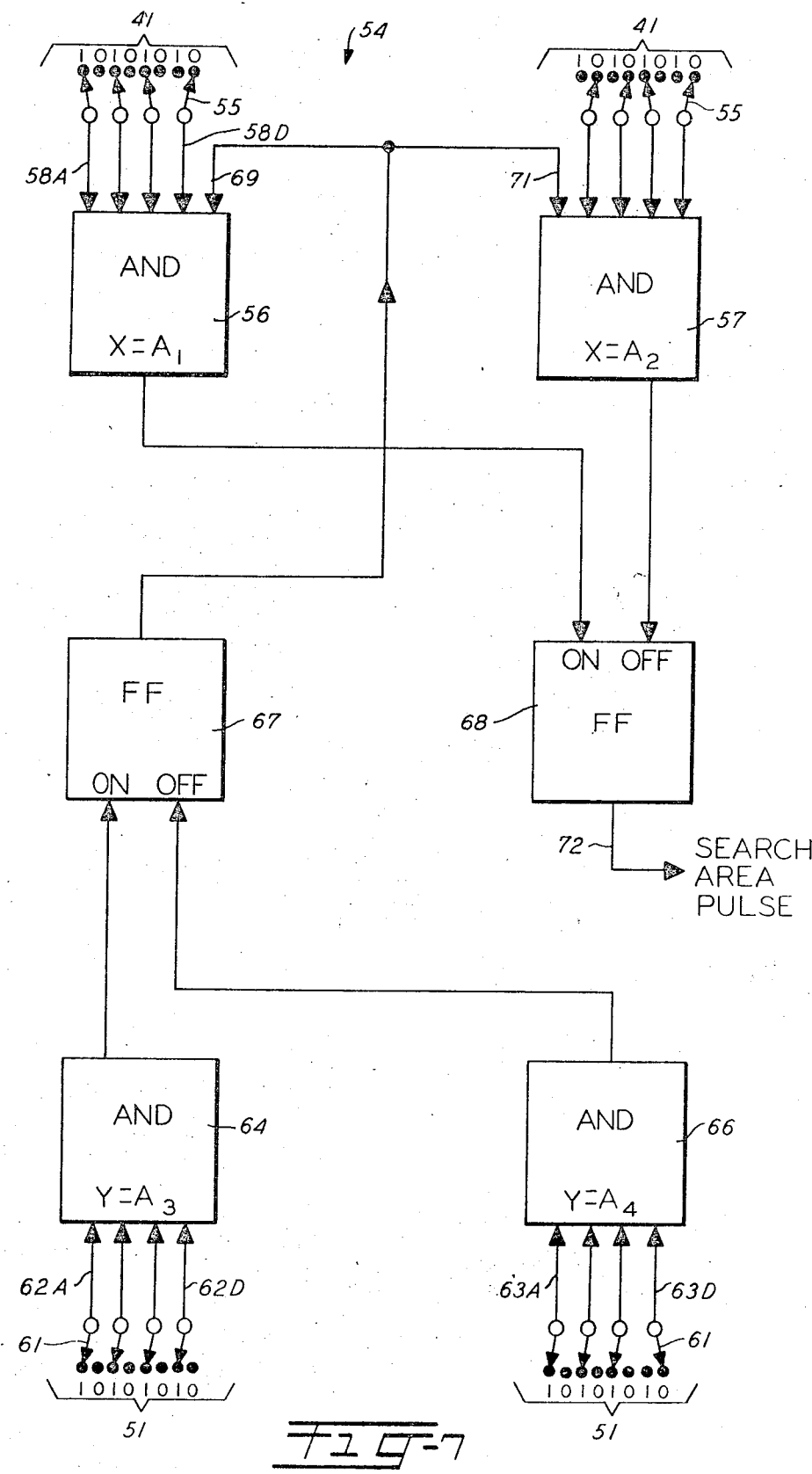
FIG. 7 is a block diagram of a search area selection circuit associated with the quantizers of FIGS. 5 and 6 for providing a pulse indication when the video camera sweeps through the common search area.

FIG. 7 illustrates a selective network 54 for producing an output pulse during and only during the time when the predetermined search area is swept by the camera. The respective outputs 41 of the horizontal quantizer 31 are applied to pairs of terminals on a plurality of switches 55. The switches 55 may be operated to selectively connect either 0 or 1 outputs from the clock 33 (FIG. 5) and each of the flip-flops 34–40 to individual ones of a pair of AND-gates 56 and 57. The positions of the switches associated with the AND-gate 56 are set such that each of the inputs (designated 58A through 58D) of the AND-gate 54 registers a binary 1 at the start of the selected increment of each horizontal sweep that corresponds to the position $X=A_1$ on the camera field of view. Similarly, the positions of the switches 55 associated with the inputs of the AND-gate 57 are selected such that each of the inputs (designated 59A–59D) of the gate 57 registers a binary 1 at the start of the selected increment of each horizontal sweep that corresponds to the position $X=A_2$ on the field of view.

In like manner, the outputs of the vertical quantizer 63D are applied to pairs of terminals on switches 61, associated with inputs 62A–62D and 63A–63D associated respectively with a second pair of AND-gates 64 and 66. The positions of the switches associated with the gate 64 are selected such that the inputs 62A–62D exhibit binary 1's at the start of the selected increment of each vertical scan corresponding to the position $Y=A_3$ on the field of view. Finally, the position of the switches associated with the AND-gate 66 are selected so that inputs 63A–63D exhibit binary 1's at the start of the selected interval of each vertical scan representing the position $Y=A_4$ on the field of view.

The outputs of the AND-gates 64 and 66 are respectively applied to ON and OFF inputs of a flip-flop 67. As a result, the "1" output of the flip-flop 67 produces an output pulse only during the time that each vertical scan is between the positions $Y=A_3$ and $Y=A_4$ on the field of view.

The outputs of the AND-gates 56 and 57 are connected to respective ON and OFF inputs of a flip-flop 68 for selectively providing output pulses to the flip-flop 68. Such output pulses are generated in response to enabling pulses applied from the output of the flip-flop 67 to respective auxiliary inputs 69 and 71 of the AND-gates 56 and 57 when the switches 55 are set as described above. Since the setting of such switches correspond to the horizontal limits $X=A_1$ and $X=A_2$ in the field of view of the camera, and since enabling pulses are generated by the flip-flop 67 only in the interval between the vertical limits $Y=A_3$ and $Y=A_4$ on the field of view, a pulse at the output of the flip-flop 68 will occur only during the intervals when the search area 52 (FIG. 4) is swept by the camera.

The search area pulse at the output of the flip-flop 68 is applied, over a line 72, to one input of an AND-gate 73 (FIG. 3). The other input of the AND-gate 73 is coupled to a video output terminal designated 74 of the camera 24. As is well known, the video output of the camera is a pulsed representation of light intensity excursions of the image of objects within the field of view of the camera 24; hence, relatively opaque portions of such image, when electronically swept by the video camera, will yield a relatively high amplitude video pulse at the output of the terminal 74, while relatively transparent regions of the image in the field of view will provide relatively low amplitude video. In the manner described in connection with FIG. 3 of the above-mentioned copending application, the video representation may be quantized (by facilities not shown in the instant drawing) to provide a video pulse output, on the terminal 74, only of objects within the field of view that do not exceed a predetermined threshold of light intensity. Since the workpiece 21 imaged in the field of view of the camera contains only highly opaque and highly transparent regions, a video pulse output at the terminal 74 will occur whenever an image of the flaw 22 is detected. The time position of the video pulse with respect to the search area pulse on the line 72 will be determined by the relative location of the opaque object represented by the video relative to the predetermined search area 52.

Figure 8:
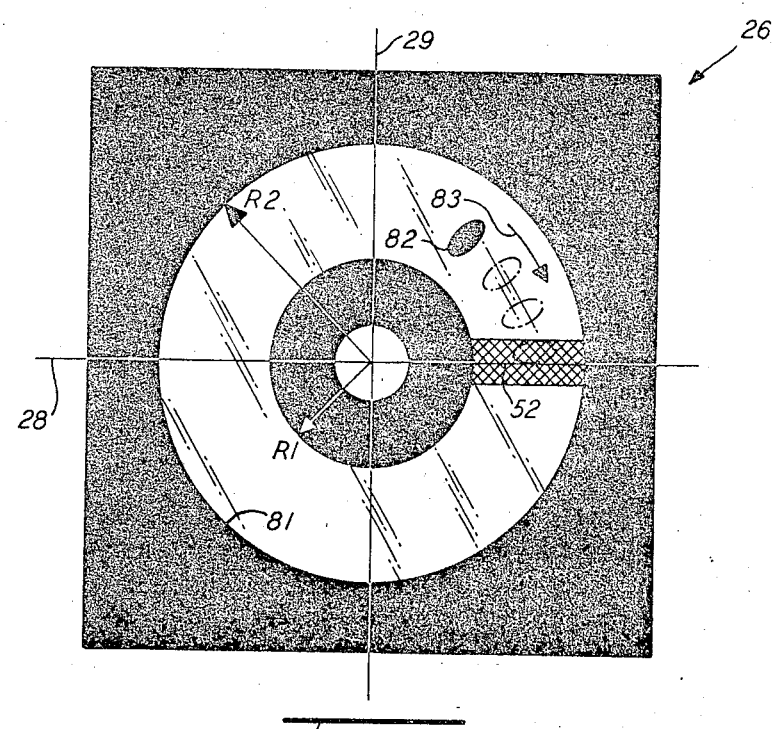
FIG. 8 is a diagrammatic representation, similar to FIG. 4, of the search area of the video camera having superimposed thereon a rotating image of the portion of the negative centered on the camera axis.

Referring now to FIG. 8, there is pictorially shown an image of the workpiece 20 as projected on the field of view 26 of the camera 24 by suitable means 76 (FIG. 3) which may include conventional fiber optic facilities. In particular, the projecting means 76 effects the transmission of an image of the workpiece 21 upwardly through a first lens 77, a prism 78 described below, and a second lens 79 onto the field of view of the camera. As shown in FIG. 8, the resulting projection of the image of the workpiece 21 on the field of view positions the image of the annular test zone of the workpiece within a corresponding annular area designated 81, on the field of view. (It will be recognized that the camera may contain suitable magnifying optics represented by the reference numeral 81A, such that the relatively minute region occupied by the actual test zone 19 (FIG. 3), the through-hole 14, and a portion of the pattern 12 in the workpiece 21 may fill up substantially the entire field of view of the camera.) If a conductive flaw 16 is present on the workpiece, its corresponding opaque image (designated 82 in FIG 8) in the annular test area 81 may initially be positioned anywhere within the area 81 with respect to the horizontal and vertical cross-hairs 28 and 29 in the field of view.

The annular area 81 has an inner radius $R_1$ and an outer radius $R_2$ which are respectively proportional, by the magnification factor of the camera optics, to the outer radius of the through-hole terminal 18 (FIG. 3) on the workpiece and the inner radius of the conductive pattern 12. Illustratively, the search area selection circuit 54 of FIG. 7 should be so adjusted, as described above, that the vertical boundaries $X = A_1$ and $X = A_2$ of the search area 52 (FIG. 3) substantially coincide with the inner radius $R_1$ and the outer radius $R_2$ of the annular test area 81 (FIG. 8), respectively. The horizontal dimensions $Y = A_3$ and $Y = A_4$ (FIG. 3) of the search area 52 may be adjusted by similar means.

It will be observed in FIG. 8 that the image 82 of the opaque flaw is displaced from the search area 52. Hence, the corresponding video pulse designating the position of the flaw 82 does not coincide in time with the pulse at the output 72 of the selection circuit 54 (FIG. 3) and no indication initially appears at the output of the AND-gate 73.

In accordance with the invention, means are provided for rotating the image 81 (FIG. 8) of the annular test zone about the camera axis such that the conductive flaw 82 will rotate through the search area 52 in the direction of an arrow 83. Each pass of the image flaw 82 through the search area 52 will result in time coincidence of pulses at the input of the AND-gate 73 (FIG. 3) to provide a pulse indication on an output 84 to indicate the detection of the conductive flaw, which indication may be utilized in any desired manner.

The above-mentioned image rotating means is represented in FIG. 3 by the combination of the prism 78, embodied as a truncated isosceles right triangle prism (known more popularly as a dove prism), together with conventional means 86 for rotating the prism 78 about the camera axis 23. The prism is vertically disposed with its axis parallel to a plane of truncation 87 and aligned with the camera axis 23. As is well known, a rotation of such prism by the rotating means 86 through a first angular distance will rotate the corresponding image of the portion of the workpiece 21 projected on the field of view of the camera through twice the angular displacement of the prism within the field of view.

It will be understood that the above-described embodiment is merely illustrative of the principles of the invention. Numerous other modifications will now suggest themselves to those skilled in the art. For example, while the rotating image technique of the invention has been directed specifically to detecting opaque flaws in a transparent annular region of a workpiece, it is generally suitable for detecting a flaw in other types of test zones wherein the flaw exhibits a light transmissive characteristic that is complementary to that of the test zone. Such variations may obviously be devised without departing from the spirit and scope of the invention.

What is claimed is:

1. An apparatus for detecting a flaw in a test zone of a workpiece wherein the flaw exhibits a light transmissive characteristic that is complementary to that of the test zone, said apparatus comprising:

means having a swept field of view for generating a first pulse when an area is intercepted within the field of view which has a light transmissive characteristic that is complementary to that of the test zone,
said means being positioned to receive an image of a portion of the workpiece that includes the test zone;
timing means operated in synchronism with each sweep of the field of view for generating a second pulse whose duration and time position define a predetermined region of the field of view;
means for rotating an image of the test zone through the predetermined region of the field of view and for excluding other portions of the workpiece from the predetermined region; and
means responsive to a coincidence of the first and second pulses for indicating the presence of a flaw in the test zone.

2. Apparatus as defined in claim 1, in which the field of view is centered on a camera axis, and in which the image rotating means comprises a truncated isosceles right triangular prism having an axis parallel to the plane of truncation, the last-mentioned axis being aligned with the camera axis intermediate the workpiece and the camera.

3. Apparatus as defined in claim 2, further comprising means for rotating the prism about the camera axis to correspondingly rotate the image of the workpiece in the field of view through twice the angular displacement of the prism about its axis.

4. An apparatus for detecting a flaw in a test zone of a workpiece wherein the flaw exhibits a light transmissive characteristic that is complementary to that of the test zone, said apparatus comprising:

means having a field of view defined by synchronized horizontal sweeps and vertical scans for generating a first pulse when an area is intercepted within the field of view which has a light transmissive characteristic that is complementary to that of the test zone, said means being positioned to receive an image of a portion of the workpiece that includes the test zone;
first timing means operated in synchronism with each horizontal sweep for generating a second pulse whose duration and time position define a first predetermined vertically bounded region of the field of view;
second timing means operated in synchronism with each vertical scan for generating a third pulse whose duration and time position represent a second predetermined horizontally bounded region of the field of view, the first and second pulses coinciding at least partially in time so that the first and second regions intersect to define a common search area of the field of view;
means for rotating an image of the test zone through the search area of the field of view and for excluding the other portions of the workpiece from the search area; and
means responsive to a coincidence of the first, second and third pulses for indicating the presence of a flaw in the test zone.

5. Apparatus as defined in claim 4, in which the test zone is a relatively transparent annular region surrounded by inner and outer relatively opaque regions, and a flaw in the annular region is manifested by an additional relatively opaque region.

6. Apparatus as defined in claim 4, in which the first timing means comprises, in combination, means rendered effective at a time corresponding to a horizontal distance $A_1$ in the field of view after the start of each horizontal sweep for initiating the first pulse, and means rendered effective at a time corresponding to a horizontal distance $A_2$ in the field of view after the start of the sweep for terminating the first pulse.

7. Apparatus as defined in claim 4, in which the second timing means comprises in combination:

means rendered effective at a time corresponding to a vertical distance $A_3$ in the field of view after the start of each vertical scan for initiating the second pulse; and means rendered effective at a time corresponding to a vertical distance $A_4$ in the field of view after the start of each vertical scan for terminating the second pulse.

8. Apparatus for detecting a flaw in a test zone of a workpiece wherein the flaw exhibits a light transmissive characteristic that is complementary to that of the test zones which comprises:

a video camera having a field of view defined by synchronized horizontal sweeps and vertical scans for generating a first pulse when an area is intercepted within the field of view which has a light-transmissive characteristic that is complementary to that of the test zone, the camera being positioned to receive an image of a portion of the workpiece that includes on the test zone;

first timing means operated in synchronism with each horizontal sweep of the video camera for generating a second pulse whose duration and time position defines a first predetermined vertically bounded region of the field of view;

second timing means operated in synchronism with each vertical scan of the video camera for generating a third pulse whose duration and time position defines a second predetermined horizontally bounded region of the field of view, the first and second pulses coinciding at least partially in time so that the first and second regions intersect to define a common search area of the field of view;

means for rotating an image of the test zone through the common search area of the field of view and for excluding other portions of the workpiece from the search area; and means rendered effective upon a coincidence of the first, second, and third pulses for indicating the presence of a flaw in the test zone.

* * * * *